July 20, 1943.　　　M. L. CRIPE　　　2,324,561
MILLING ATTACHMENT FOR LATHES
Filed May 16, 1941　　　2 Sheets-Sheet 2
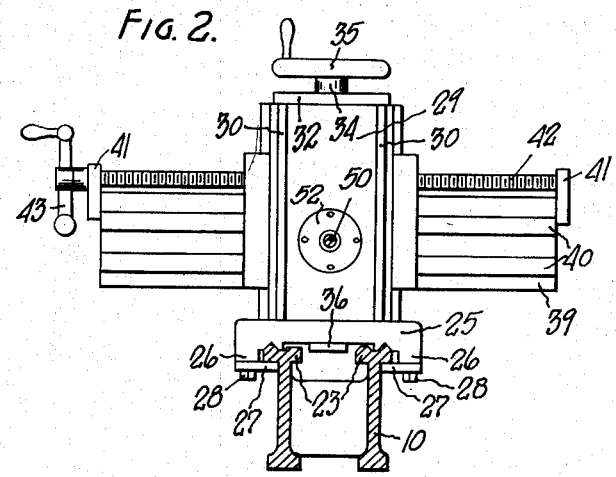
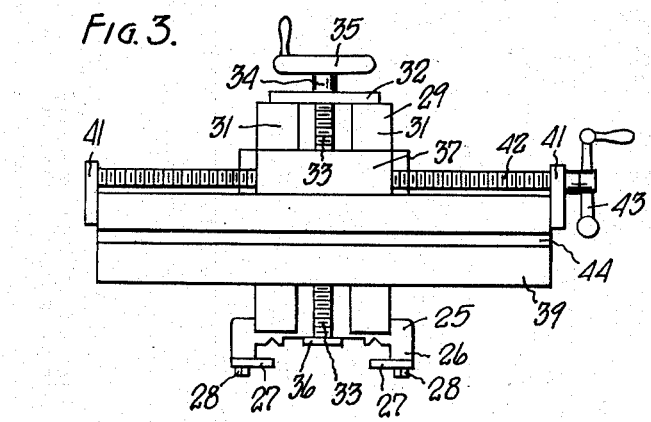
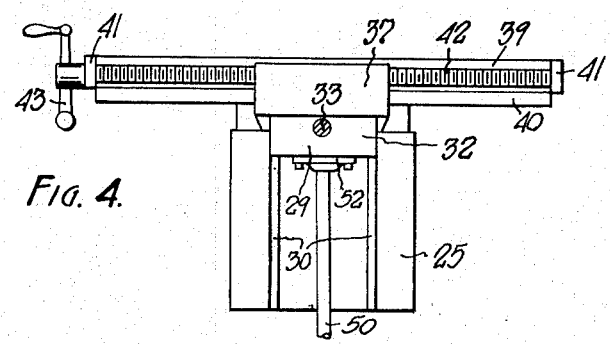
INVENTOR.
MAXWELL L. CRIPE.
BY Oltsch & Knoblock
Attorney.

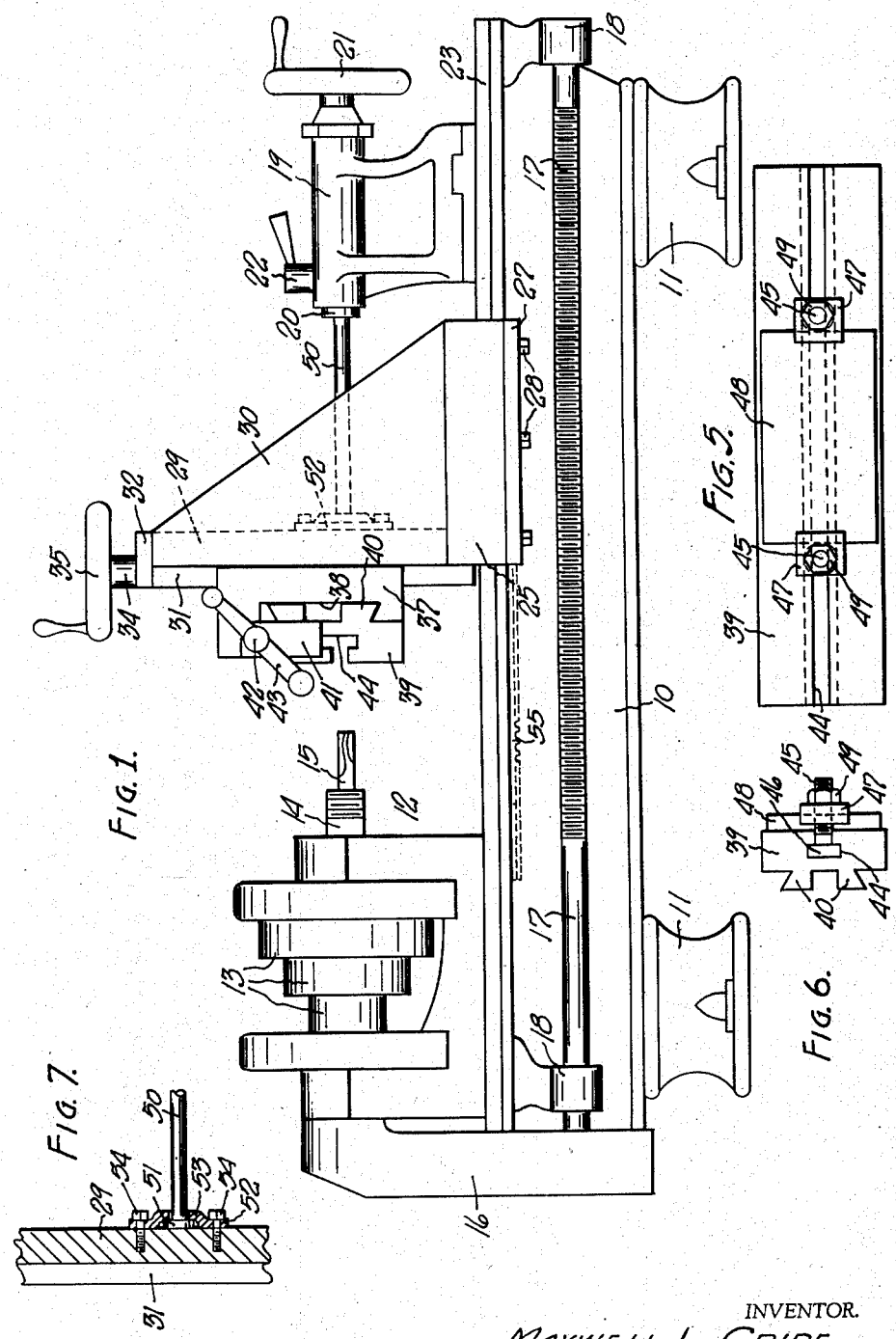

Patented July 20, 1943

2,324,561

UNITED STATES PATENT OFFICE 2,324,561

MILLING ATTACHMENT FOR LATHES

Maxwell L. Cripe, South Bend, Ind.

Application May 16, 1941, Serial No. 393,702

6 Claims. (Cl. 90—58)

This invention relates to a milling attachment for lathes, and more particularly to an attachment which may readily be applied to and removed from a lathe to render the lathe capable of milling in addition to turning work.

The primary object of this invention is to provide a milling attachment of this character which is novel, simple, accurate, efficient, and inexpensive.

A further object is to provide a milling attachment knee adapted to be mounted in vertical position on a lathe and to be solidly supported on a lathe to avoid chatter and vibration in operation.

A further object is to provide a milling attachment having a knee adapted to be mounted in vertical position on a lathe and to be connected with the tail stock of the lathe for the purpose of reinforcing or supporting the knee and for the further purpose of accommodating a micrometrical adjustment of the knee upon a lathe bed by operation of the tail stock spindle.

A further object is to provide a milling attachment adapted to be mounted on a lathe in a vertical position facing the head stock of the lathe and to be subjected to pressure applied in the direction of the head stock by the tail stock of the lathe, whereby tension of the attachment at its mounting on the bed of the lathe is reduced to a minimum.

A further object is to provide a milling attachment adapted to be slidably mounted on the ways of a lathe bed and adapted to adjustably support work thereon, said attachment being connected to the tail stock of the lathe by a member associated and aligned with a tail stock spindle to directly sustain the pressure applied to the work by a milling tool carried by the head stock.

A further object is to provide a milling attachment of this character with a novel work holder.

Other objects will be apparent from the description, drawings, and appended claims.

In the drawings:

Fig. 1 is a view of a lathe in side elevation having my improved milling attachment mounted thereon.

Fig. 2 is a view of the milling attachment in rear elevation, with the ways of a lathe bed mounting the same illustrated in section.

Fig. 3 is a front elevation of the milling attachment.

Fig. 4 is a top plan view of the milling attachment.

Fig. 5 is a face elevation of the work holder per se with work mounted thereon.

Fig. 6 is a side elevation of the work holder.

Fig. 7 is a fragmentary vertical sectional detail view.

Referring to the drawings, which illustrate the preferred embodiment of the invention, the numerol 10 designates the bed of any conventional lathe which is supported upon legs 11. The lathe includes a head stock 12 having a driving step pulley 13 for operating the head stock spindle 14 adapted to carry a milling or other tool 15. Back geared or suitable means is provided at 16 for driving a lead screw 17 journaled at 18 at opposite ends of the lathe bed. A tail stock 19, having a tail stock spindle 20 adapted to be operated by hand wheel 21, is provided with suitable means 22 for locking the tail stock assembly in fixed position upon the ways 23 of the bed of the lathe.

My improved milling attachment comprises a base plate 25 whose lower surface is suitably grooved to fit accurately and slidably upon the ways 23 of the lathe bed. Opposite side portions 26 of the base 25 depend longitudinally and in spaced relation to the ways 23 and are adapted to have retainer plates 27 secured thereto at 28. The plates 27 are adapted to extend under and bear against the outermost portions of the front and rear ways of the lathe bed to retain the base upon the ways with a snug or clamping fit.

The milling attachment knee is mounted fixedly upon the base plate 25 and comprises a transverse vertical plate 29 projecting upwardly from the front end of base 25 and reinforcing side plates 30 at opposite sides of plate 29 extending rearwardly therefrom for the full length of the base 25. Plates 30 are preferably of substantially triangular shape as illustrated. A pair of spaced vertical, dovetail guide members 31 project from the front face of the knee plate 29. A plate 32 is mounting upon the upper end of the knee plate 29 and journals the upper end of a vertical screw threaded feed shaft 33, provided with a bearing collar 34 bearing upon said plate and an operating hand wheel 35. A horizontal plate 36 projects from the front of the base 25 and serves to journal the lower end of the shaft 33.

A slide 37, provided with dovetailed grooves in its rear face, fits snugly and slidably upon the dovetailed guides 31 of the knee 29. Slide 37 is provided with suitable means (not shown) of a character well understood in the art, for screw threaded engagement with the shaft 33, whereby operation of said shaft by hand wheel 35 will serve to vertically adjust said slide upon the knee. The front face of slide 37 is provided with a horizontal dovetail groove 38.

A work holder plate 39, preferably horizontally elongated, is provided with dovetail guides 40 upon its rear face adapted to fit snugly and slidably in the dovetailed groove 38 of the slide 37. At its opposite ends, work holder 39 mounts transverse vertical plates 41 which journal the opposite ends of an elongated screw threaded shaft 42 adapted to be operated by a crank 43. The screw threaded shaft 42 passes through a suitably screw threaded bore in the slide 37 whereby operation of the crank 43 to rotate the shaft 42 will serve to adjust the work holder 39 transversely of the slide 37 and the knee 29. The front face of the work holder 39 is provided with a T-slot 44 extending horizontally and longitudinally thereof.

A pair of bolts 45 having enlarged head 46 are slidably adjustable in the T-slots 44, with the bolt heads 46 fitting in the enlarged portion of the slot and the bolt shanks extending through the narrow portion of the slot. A clamp member 47 is mounted on each bolt 45 and is of any suitable character adapted to seat against the opposite end portions of the work piece 48. Nuts 49 are threaded on shafts 45 and bear against clamp members 47 to press members 47 in clamping engagement with work piece 48.

A rod 50 is suitably mounted in the spindle 20 of the tail stock 19, and projects longitudinally forwardly therefrom. Rod 50 terminates in an enlarged head 51 which preferably bears against the rear face of the knee plate 29. A plate 52, having a center aperture receiving the rod 50, and off-set at 53 to form a socket fitting around the enlarged head 51 of the rod 50, is secured to the rear face of knee plate 29 by bolts 54.

When the milling attachment is to be used upon the lathe, the usual compound tool rest of the lathe (not shown herein) is removed from the lathe bed 10, and the milling attachment above described is mounted upon the lathe bed. It will be observed that the provision of the plates 27, which are removable from the base 25 of the milling attachment upon removal of the bolts 28, accommodates the application of the milling attachment to the lathe bed and its removal therefrom. The rod 50 is then mounted in the usual tail stock spindle of a lathe, and the device is then ready for use.

Note that, although the device provides a long, guided, bearing engagement between base 25 and the ways of the lathe bed, which in itself tends to eliminate a large measure of play or tilting of said base upon the lathe bed, this bearing engagement is not relied upon alone for the purpose of accurately positioning the milling attachment and holding it against vibration and tension incident to the milling operation. Thus, the rod 50, which extends between the tail stock and the milling knee plate 29 in axial alignment with the milling cutter 15 upon the head stock, serves to fully and directly sustain the pressure applied to the work and the attachment by the milling tool 15, and to relieve the tension to which the base 25 engaging the ways of the lathe bed would otherwise be subjected. Furthermore, by adjustment of the rod 50 the same may be utilized to apply pressure to the knee and to the work carried thereby to fully counterbalance or overcome the pressure normally applied by the tool 15. One important result or advantage of this arrangement and combination is that it fully eliminates chatter and vibration during a milling operation.

A further important advantage of the device resides in the ability to obtain a micrometric adjustment of the position of the milling attachment upon the lathe bed, by means of longitudinal adjustment of rod 50 by hand wheel 21, as differentiated from an adjustment effected through a rack 55 on the lathe bed as has been common heretofore in devices designed for attachment upon a lathe.

It will be observed that when the milling attachment has been properly mounted upon the lathe bed, and rod 50 has been connected with the tail stock spindle, a work piece 48 may be clamped upon the work holder 39 in the manner illustrated in Figs. 5 and 6. Then the position of the slide 37 upon the knee 29 may be adjusted vertically by operation of hand wheel 35, and the position of the work transversely of the lathe bed may be adjusted by operation of crank 43. Hence, the device is provided with all adjustments necessary preparatory to and during any given milling operation. Note also, that regardless of the position of the parts of the milling attachment, the pressure applied to the work by the milling tool is always sustained directly by the rod 50 and the tail stock 19 which are axially aligned with the milling tool 15.

I claim:

1. The combination with a lathe having a bed and a tailstock, said tailstock including a tailstock spindle, of a work holder clamped upon said bed and longitudinally adjustable thereon, and an elongated longitudinally extending member carried by said tailstock spindle and secured to said work holder.

2. The combination with a lathe having a lathe bed, headstock, and a tailstock having an adjustable tailstock spindle, of adjustable means for mounting a work element in vertical position transversely of said lathe and facing said headstock, said mounting means bearing upon and being longitudinally adjustable on said lathe bed, and an elongated member carried by said tailstock spindle and secured to said mounting means, said member being positioned in axial alignment wtih said headstock and tailstock.

3. A milling attachment adapted to be adjustably mounted on the ways of the bed of a lathe having a headstock and a tailstock, comprising a base having grooves in its bottom face seating on said ways, means for clamping said base on said ways, an upright member rigidly carried by said base transverse of said lathe bed, a slide mounted on said upright member for vertical guided movement, a work holder mounted on said slide facing said headstock for horizontal guided movement transverse of said lathe bed, and an elongated horizontal member carried by said upright opposite said work holder and aligned with and adapted for connection with said tailstock.

4. A milling attachment adapted to be adjustably mounted on the ways of the bed of a lathe having a headstock and a tailstock, comprising an elongated base having longitudinal groves seating on said ways, an upright fixedly mounted on said base, a work holder, means mounting said work holder on said upright for adjustment in vertical and transverse horizontal directions, and an elongated connector carried by said upright and extending parallel to said ways for connection with said tailstock.

5. A milling attachment adapted to be slidably mounted on the ways of the bed of a lathe having a headstock and a tailstock, comprising a member adapted to be adjustably mounted on the lathe bed in upright position transversely of said lathe bed, a work holder adjustable on said upright member and adapted to face said headstock, and a horizontal connector projecting from the upright opposite said workholder and adapted to extend parallel to said lathe bed in alignment and for connection with said tailstock.

6. A milling attachment for a lathe having a lathe bed, a headstock, and a tailstock including a spindle, comprising an upright adapted to be adjustably mounted on said lathe bed transversely thereof, workholding means carried by said upright facing said headstock, a socket carried by the opposite side of said upright, and a rigid horizontal member having a head fitting in said socket and bearing against said upright, the outer end of said member being of a size to be received by said tailstock spindle.

MAXWELL L. CRIPE.